(12) United States Patent
Watts et al.

(10) Patent No.: US 11,652,738 B2
(45) Date of Patent: May 16, 2023

(54) SYSTEMS AND METHODS FOR UTILIZING SEGMENT ROUTING OVER AN INTERNET PROTOCOL DATA PLANE FOR LATENCY METRICS REDUCTION

(71) Applicant: Verizon Patent and Licensing Inc., Basking Ridge, NJ (US)

(72) Inventors: Mark T. Watts, Newport, RI (US); Andrea Karcher, New Freedom, PA (US); Prasad Deviprasad, Cary, NC (US); Donna L. Polehn, Mercer Island, WA (US); Gregory Pultorak, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/248,096

(22) Filed: Jan. 8, 2021

(65) Prior Publication Data
US 2022/0224635 A1    Jul. 14, 2022

(51) Int. Cl.
*H04L 45/00* (2022.01)
*H04L 45/12* (2022.01)
*H04L 45/24* (2022.01)
*H04L 43/16* (2022.01)
*H04L 61/5007* (2022.05)
*H04L 101/663* (2022.01)

(52) U.S. Cl.
CPC .............. *H04L 45/22* (2013.01); *H04L 43/16* (2013.01); *H04L 45/123* (2013.01); *H04L 45/24* (2013.01); *H04L 61/5007* (2022.05); *H04L 2101/663* (2022.05)

(58) Field of Classification Search
CPC ....... H04L 45/22; H04L 43/16; H04L 45/123; H04L 45/24
See application file for complete search history.

(56) References Cited

U.S. PATENT DOCUMENTS

| | | | |
|---|---|---|---|
| 2004/0218525 A1* | 11/2004 | Elie-Dit-Cosaque | ... H04L 45/28 370/227 |
| 2009/0304007 A1* | 12/2009 | Tanaka | ............... H04L 12/4641 370/395.53 |
| 2016/0211988 A1* | 7/2016 | Lucas | .................... H04L 45/22 |
| 2017/0188072 A1* | 6/2017 | Major | ............. H04N 21/23439 |
| 2021/0352007 A1* | 11/2021 | Boutros | ................. H04L 45/34 |

* cited by examiner

*Primary Examiner* — Abdulkader M Alriyashi

(57) ABSTRACT

A device may provide path data identifying a primary path and one or more alternate paths for segment routing traffic in the network, and may receive performance data indicating a performance degradation in the primary path. The device may determine that the performance data satisfies a first threshold, and may request, based on the performance data satisfying the first threshold, alternate path performance data. The device may receive the alternate path performance data based on the request, and may compare the alternate path performance data for the one or more alternate paths. The device may select a particular alternate path, of the one or more alternate paths, based on comparing the alternate path performance data for the one or more alternate paths, and may trigger, based on the performance data satisfying a second threshold, a failover of the traffic from the primary path and to the particular alternate path.

20 Claims, 10 Drawing Sheets

SYSTEMS AND METHODS FOR UTILIZING SEGMENT ROUTING OVER AN INTERNET PROTOCOL DATA PLANE FOR LATENCY METRICS REDUCTION

BACKGROUND

Segment routing over an Internet protocol version 6 data plane (SRv6) is a network programming concept that represents a capability of a network to encode a network program into individual network instructions (e.g., functions) which are then inserted into IPv6 packet headers.

DETAILED DESCRIPTION OF PREFERRED EMBODIMENTS

Figure 1A:
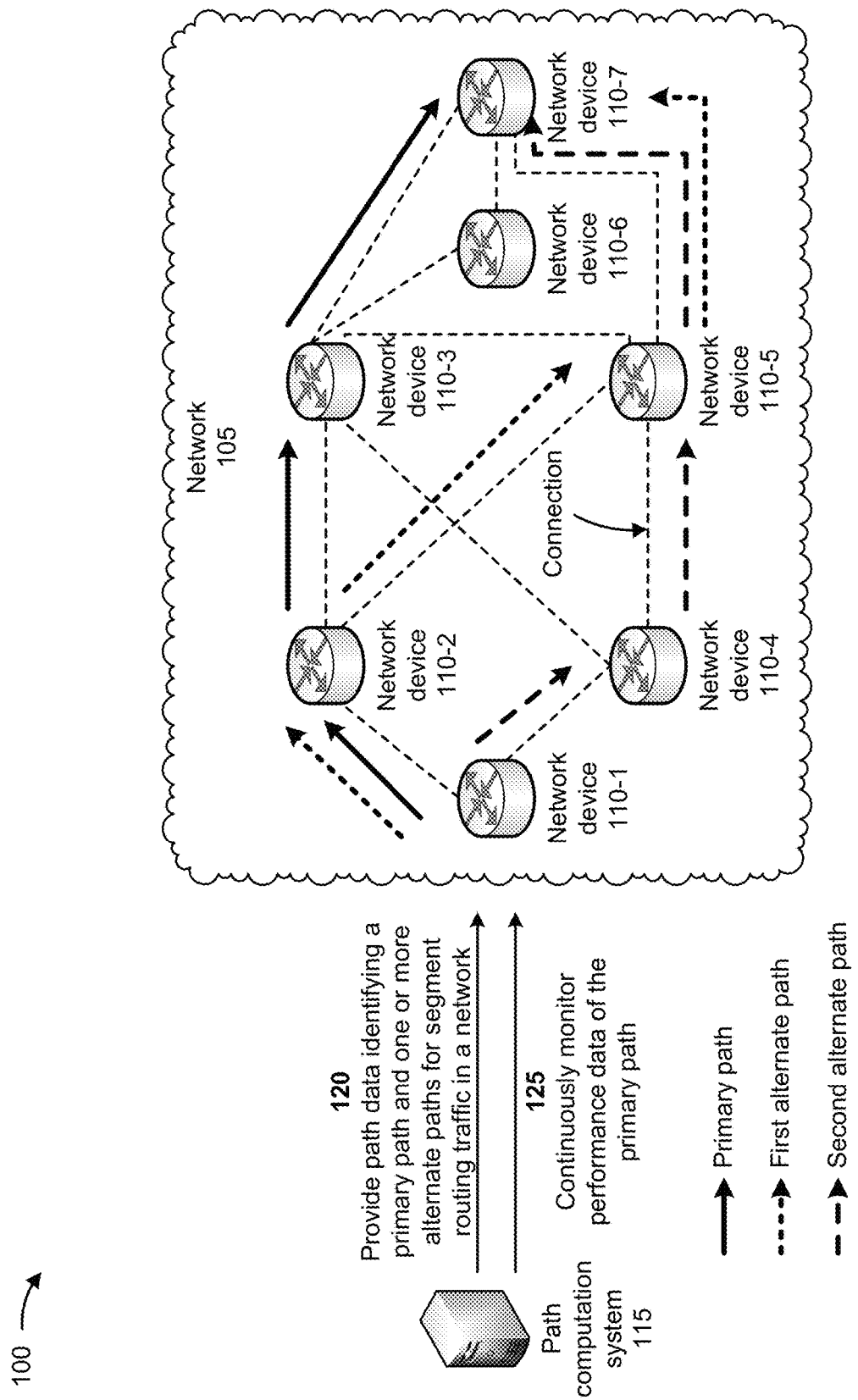
FIGS. 1A-1G are diagrams of an example associated with utilizing SRv6 for latency metrics reduction.

The following detailed description of example implementations refers to the accompanying drawings. The same reference numbers in different drawings may identify the same or similar elements.

Determining latencies between network devices utilizing SRv6 (e.g., to identify low latency alternate failover paths for a primary path) is very data intensive and demanding. A fixed measurement of end point network devices may be conducted via Internet control message protocol (ICMP) or a two-way active measurement protocol (TWAMP). However, a major drawback of ICMP is that ICMP is a specific protocol that is usually treated differently than other network bearer traffic such as user datagram protocol (UDP) and transmission control protocol (TCP). Commonly, ICMP traffic is given a very low processing priority relative to other types of network traffic. As such, ICMP is not a reliable predictor of the latency and/or performance that can be expected on a particular network path by UDP or TCP traffic.

TWAMP defines a standard for measuring IP performance between two network devices in a network. Two-way measurements are helpful because round-trip delays do not require host clock synchronization and remote support might be a simple echo function. TWAMP has two types. A first type of TWAMP uses UDP and a second type of TWAMP uses TCP. As such, routers and other network elements cannot differentiate between TWAMP packets and other user bearer packets and, therefore, TWAMP may be a more reliable way to test a network path relative to ICMP.

However, regardless of the protocol utilized, conventional methods for testing a network path have several shortcomings. For example, conventional methods rely on systematic testing that repeatedly transmits packets over all possible paths or routes at a constant rate (e.g., 10 packets per second (PPS), 100 PPS, and/or the like). Measuring all available paths is cumbersome and data collection intensive, and measuring all intermediate cross-sections and stitching that data together can be inaccurate and computationally complex. Thus, current techniques for identifying low latency alternate paths in the SRv6 domain waste computing resources (e.g., processing resources, memory resources, communication resources, and/or the like), networking resources, and/or the like associated with handling network outages, measuring all available data paths simultaneously, handling consumer complaints associated with network outages, and/or the like.

Some implementations described herein provide a path computation system that utilizes SRv6 for latency metrics reduction. For example, the path computation system may provide, to a network of network devices, path data identifying a primary path and one or more alternate paths for segment routing traffic in the network, and may receive performance data indicating a performance degradation in the primary path. The path computation system may determine that the performance data satisfies a first threshold, and may request, from the network and based on the performance data satisfying the first threshold, alternate path performance data identifying performances of the one or more alternate paths. The path computation system may receive, from the network, the alternate path performance data based on the request, and may compare the alternate path performance data for the one or more alternate paths. The path computation system may select a particular alternate path, of the one or more alternate paths, based on comparing the alternate path performance data for the one or more alternate paths, and may trigger, based on the performance data satisfying a second threshold, a failover of the traffic from the primary path and to the particular alternate path, after selection of the particular alternate path.

In this way, the path computation system may utilize a primary path for traffic in a network until a degradation in performance in the primary path is detected (e.g., a threshold level of latency is introduced into the primary path). Once the degradation in performance is detected, the path computation system may request and receive, on demand, performance data associated with alternate paths of the network. The path computation system may select an optimal alternate path based on the performance data and may trigger utilization of the optimal alternate path until the performance degradation in the primary path is eliminated. By obtaining performance data associated with the alternate paths and selecting the optimal alternate path when a degradation in the performance of the primary path is detected, the path computation system conserves computing resources that would otherwise have been utilized by obtaining performance data associated with alternate paths and selecting an optimal alternate path during periods of time in which the primary path is not experiencing a degradation in performance resulting in an alternate path being utilized to route traffic through the network.

FIGS. 1A-1G are diagrams of an example 100 associated with utilizing SRv6 for latency metrics reduction. As shown in FIGS. 1A-1G, example 100 includes a network 105, network devices 110, and a path computation system 115. Network 105 may include a network connecting a radio access network (RAN) with an LTE or 4G network, a 5G network, and/or the like. Each network device 110 may include a router, a gateway, a switch, and/or the like. Path computation system 115 may include a system that utilizes SRv6 for latency metrics reduction.

As shown in FIG. 1A, and by reference number 120, the path computation system 115 provides path data identifying a primary path and one or more alternate paths for segment routing traffic in the network 105. The path computation system 115 may provide the path data to one or more network devices 110 included in the network 105. For example, as shown in FIG. 1A, the path computation system 115 provides the path data to network devices 110-1 through 110-7. The traffic routed through the network 105 may include Internet protocol version 6 packets with headers that include individual network instructions. The primary path and the one or more alternate paths may be data plane paths and/or may provide SRv6 for the traffic.

As shown by reference number 125, the path computation system 115 monitors performance data of the primary path. For example, the path computation system 115 may periodically (e.g., every 0.5 seconds, every second, and/or the like) test the primary path to obtain performance data associated with the primary path. The performance data may include data indicating latency metrics such as a latency associated with the primary path, a packet loss associated with the primary path, packet jitter associated with the primary path, and/or another type of performance data. The path computation system 115 may analyze the performance data of the primary path to determine a performance associated with transmitting traffic via the primary path. For example, the path computation system 115 may analyze the performance data to determine a latency associated with transmitting traffic via the primary path, a packet loss associated with transmitting traffic via the primary path, a packet jitter associated with transmitting traffic via the primary path, and/or the like.

Figure 1B:
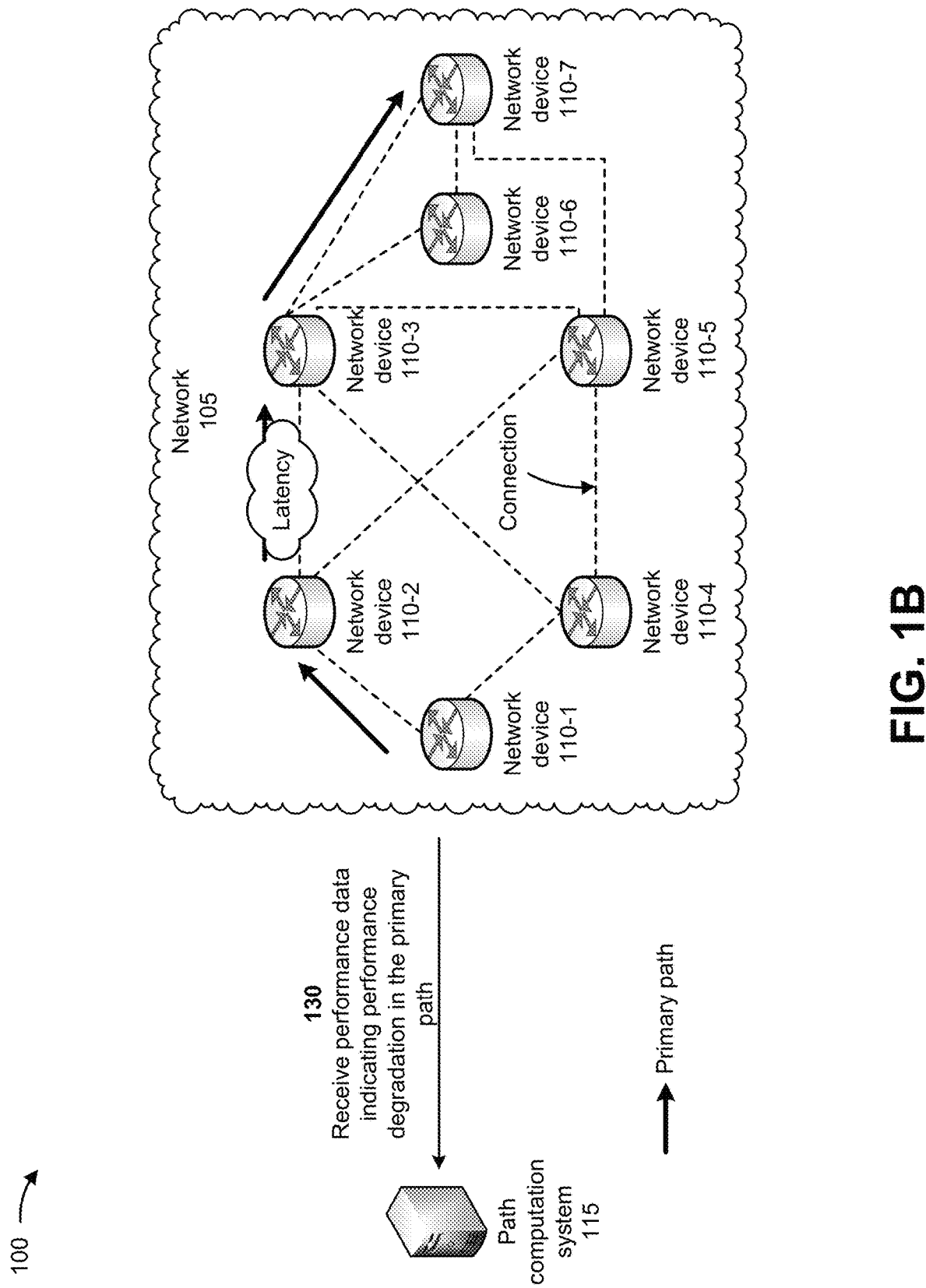

In some implementations, the path computation system 115 determines a performance degradation in the primary path based on monitoring the performance data. For example, as shown in FIG. 1B, the path computation system 115 receives performance data indicating a performance degradation in the primary path. The path computation system 115 may analyze the performance data and may determine a performance degradation in the primary path based on the analysis.

Figure 1C:
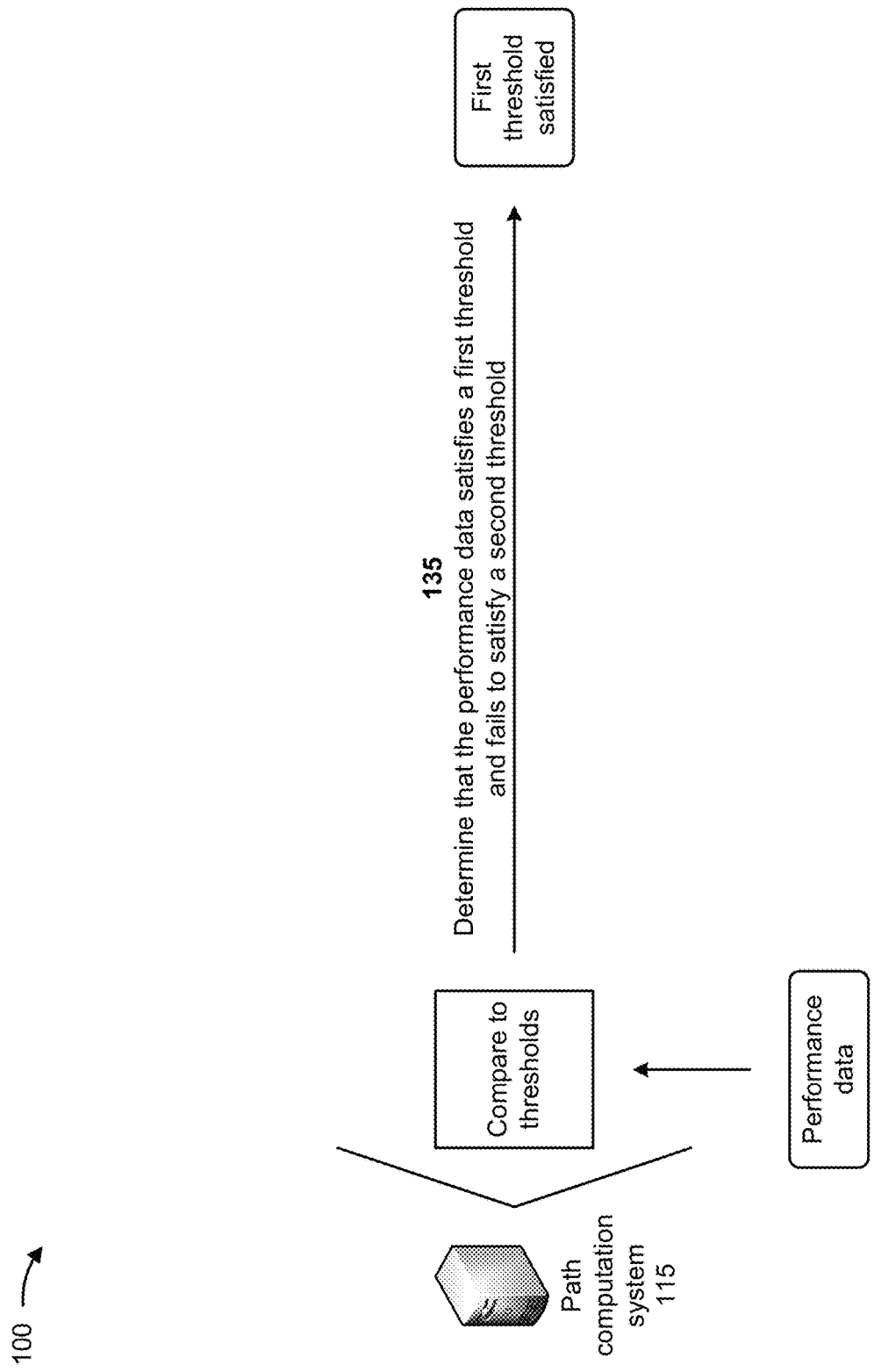

As shown in FIG. 1C, and by reference number 135, the path computation system 115 determines that the performance data satisfies a first threshold and fails to satisfy a second threshold. The first threshold and/or the second threshold may be associated with one or more key performance indicators (KPIs) associated with the primary path and/or the network 105. The performance data may satisfy the first threshold and may fail to satisfy the second threshold when performance of the primary path is degraded but the performance data is within the KPI parameters associated with the primary path. The performance data may satisfy the second threshold when the primary path is degraded and performance data is outside the KPI parameters associated with the primary path.

As an example, the primary path may be associated with a latency KPI parameter having a particular value (e.g., 0.05 ms). The first threshold may correspond to a latency parameter associated with the primary path that is less than, or equal to, the particular value (e.g., 0.04 ms). The second threshold may correspond to a latency parameter associated with the primary path that is greater than, or equal to, the particular value (e.g., 0.05 ms). The performance data may satisfy the first threshold and may fail to satisfy the second threshold when the performance data includes a latency parameter having a value greater than the first threshold and less than the particular value and the second threshold (e.g., a latency parameter having a value of 0.045 ms).

In some implementations, the path computation system 115 determines whether a plurality of parameters included in the performance data satisfy a plurality of first thresholds and/or fail to satisfy a plurality of second thresholds. Each first threshold and/or second threshold may be associated with a respective KPI parameter. The path computation system 115 may determine the degradation in performance of the primary path based on one or more (e.g., all, 95%, 90%, and/or the like) of the plurality of parameters satisfying one or more of the first thresholds. Alternatively, and/or additionally, the first threshold may be associated with a group of KPI parameters associated with the primary path.

Figure 1D:
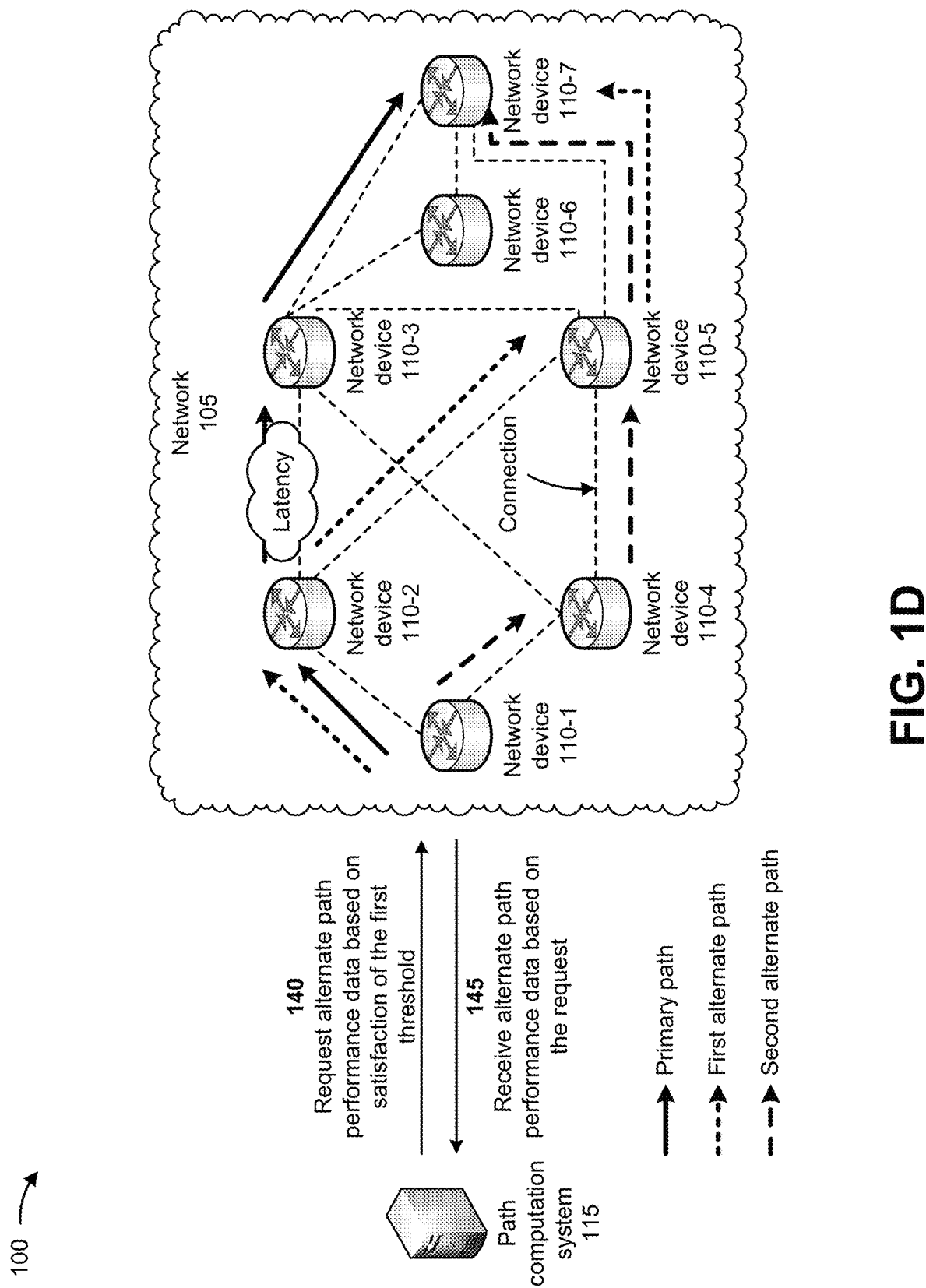

As shown in FIG. 1D, and by reference number 140, the path computation system 115 requests alternate path performance data based on the performance data satisfying the first threshold. The path computation system 115 may request the alternate path performance data in order to select an alternate path for routing traffic through the network, as described in greater detail below. By requesting the alternate path performance data based on the degradation in the performance of the primary path, the path computation system 115 conserves computing resources that would otherwise have been utilized by periodically obtaining alternate path performance data.

As shown by reference number 145, the path computation system 115 receives the alternate path performance data based on the request. The alternate path performance data may include data identifying a latency associated with each of the one or more alternate paths, a packet loss associated with each of the one or more alternate paths, packet jitter associated with each of the one or more alternate paths, and/or the like. In some implementations, the path computation system 115 utilizes SRv6 with two-way active measurement protocol (TWAMP) to receive the alternate path performance data from the network.

Figure 1E:
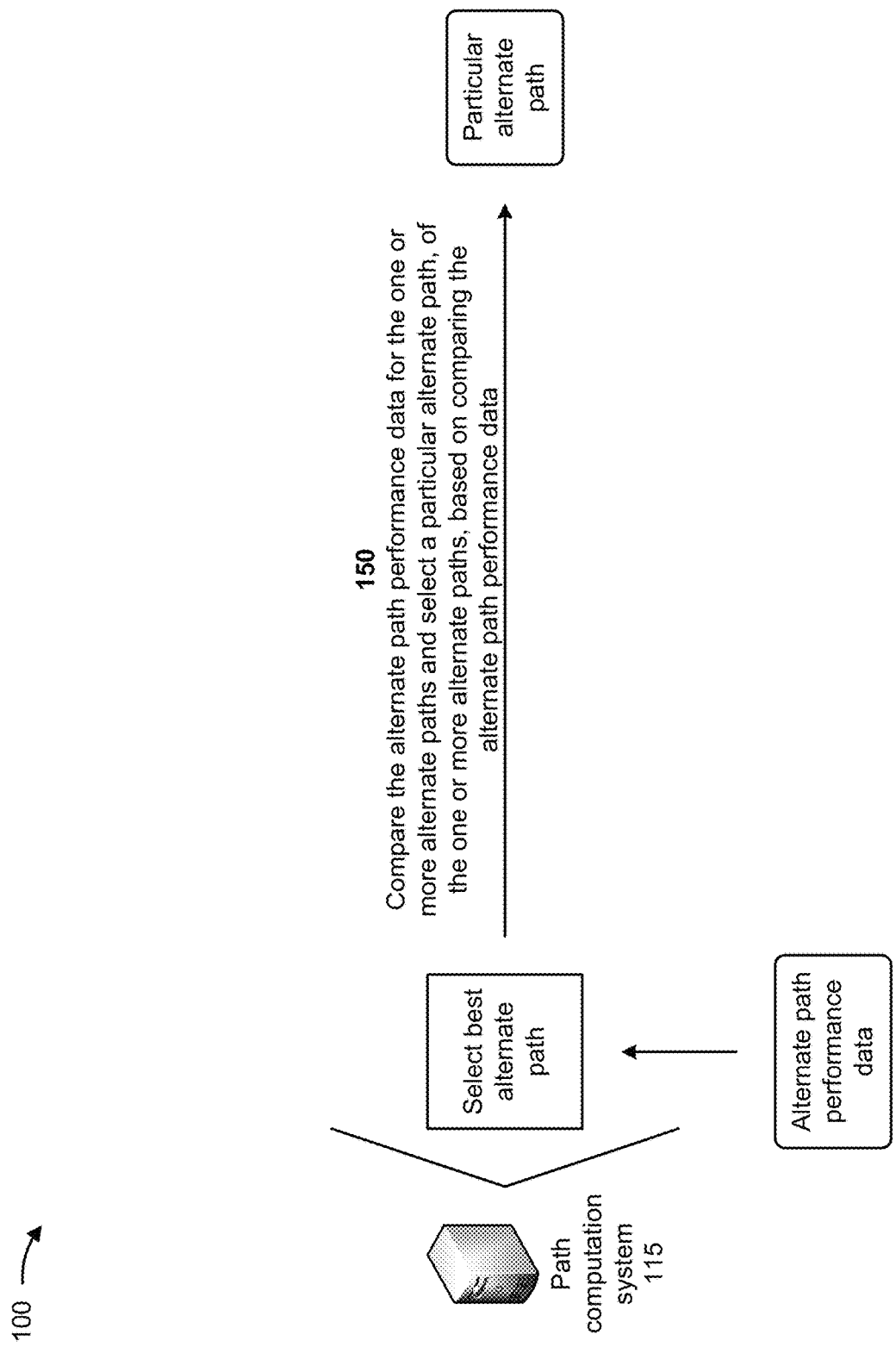

As shown in FIG. 1E, and by reference number 150, the path computation system 115 compares the alternate path performance data for the one or more alternate paths and selects a particular alternate path, of the one or more alternate paths, based on comparing the alternate path performance data. In some implementations, the path computation system 115 selects the particular alternate path based on a performance of the particular alternate path being better than performances of the remaining one or more alternate paths, as the particular alternate path. For example, the path computation system 115 may select the particular alternate path based on a latency, packet loss, jitter, and/or the like of the particular alternate path being lower than the latencies, packet losses, jitters of the other alternate paths. Alternatively, and/or additionally, the path computation system 115 selects the particular alternate path based on a priority, a latency, and/or a utilization metric associated with the particular alternate path.

The path computation system 115 may continuously monitor performance data associated with the primary path to determine whether the performance data satisfies the second threshold (e.g., whether parameters associated with the primary path are outside the KPI parameters associated with the primary path). In some implementations, the path computation system 115 determines that the performance data fails to satisfy the second threshold. The path computation system 115 may maintain the primary path based on the performance data failing to satisfy the second threshold.

Figure 1F:
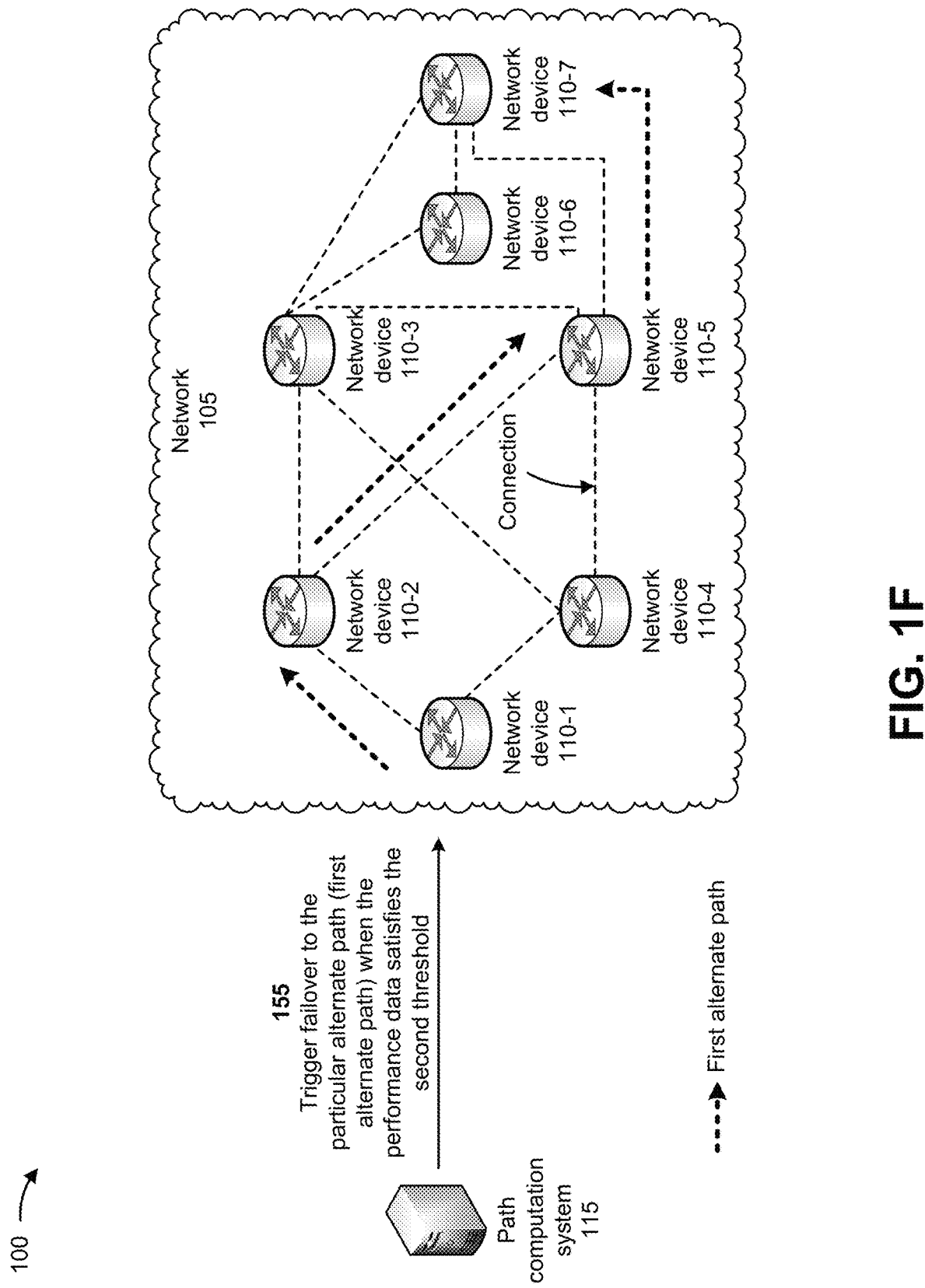

In some implementations, the path computation system 115 determines that the performance data satisfies the second threshold. As shown in FIG. 1F, and by reference number 155, the path computation system 115 triggers failover to the particular alternate path (e.g., the first alternate path, as shown in FIG. 1F) when the performance data satisfies the second threshold.

In some implementations, the path computation system 115 may monitor performance data associated with the particular alternate path based on triggering the failover to the particular alternate path. The path computation system 115 may determine that the performance data associated with the particular alternate path satisfies the first threshold and fails to satisfy the second threshold, in a manner similar to that described above with respect to FIG. 1C. The path computation system 115 may obtain alternate path performance data associated with the remaining alternate paths in a manner similar to that described above with respect to FIG. 1D. The path computation system 115 may select one of the remaining alternate paths based on comparing the alternate performance data associated with the remaining alternate paths in a manner similar to that described above with respect to FIG. 1E. The path computation system 115 may trigger failover to the selected one of the remaining alternate paths if the performance data associated with the particular alternate path satisfies the second threshold, in a manner similar to that described above with respect to FIG. 1F.

In those implementations when the path computation system 115 triggers failover to the particular alternate path and/or the selected one of the remaining alternate paths, the path computation system 115 may continue to monitor performance data associated with the primary path. The path computation system 115 may determine that the performance data fails to satisfy the second threshold based on continuing to monitor the performance data associated with the primary path.

Figure 1G:
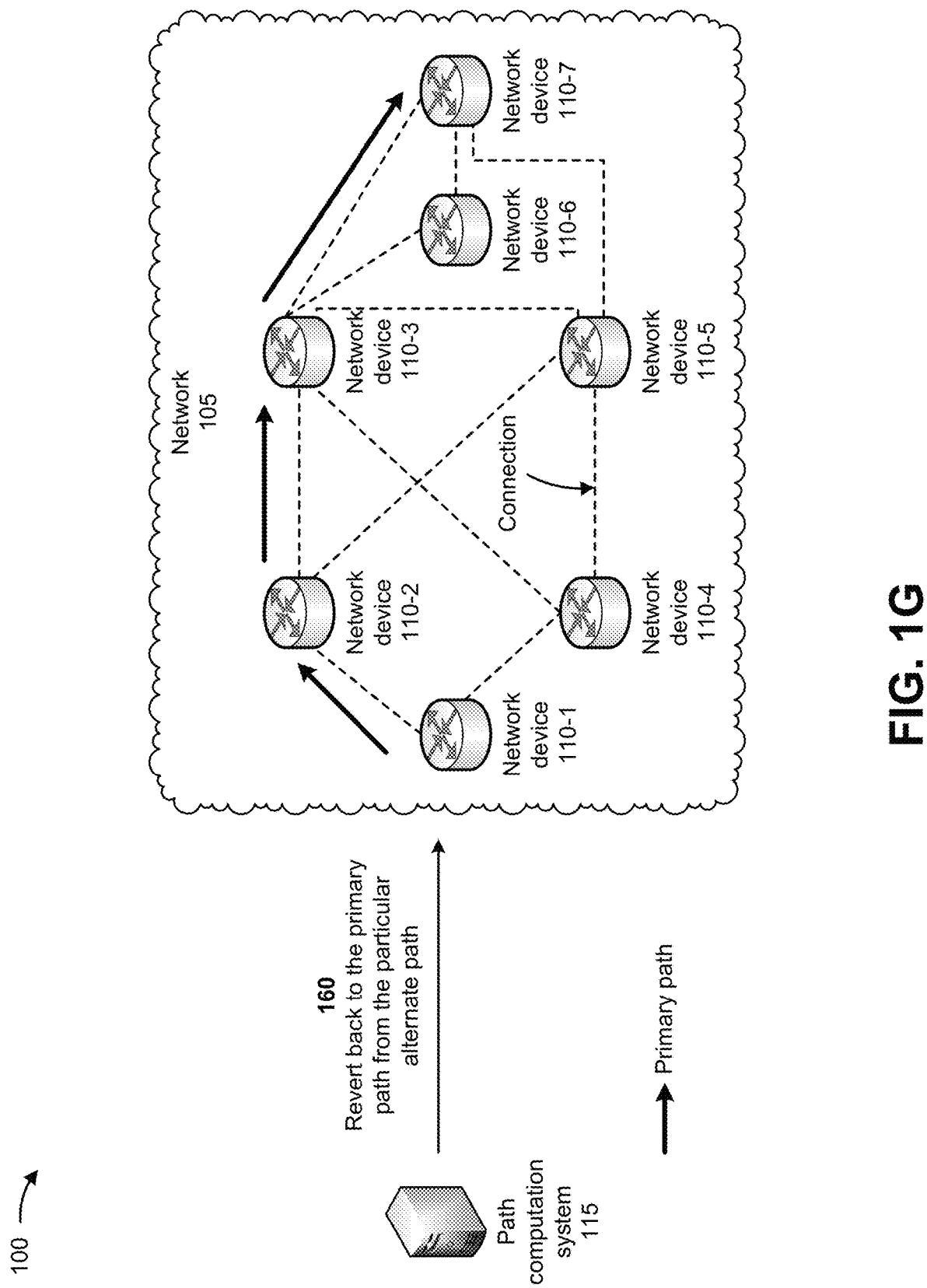

As shown in FIG. 1G, and by reference number 160, the path computation system 115 reverts back to the primary path from the particular alternate path (or the selected one of the remaining alternate paths). For example, the path computation system 115 may transmit information indicating that the network devices 110 are to utilize the primary path to route traffic through the network, to cause the network devices 110 to revert back to the primary path from the particular alternate path. The path computation system 115 may prevent the alternate path performance data from being obtained based on reverting back to the primary path, thereby conserving computing resources that otherwise would have been utilized to obtain the alternate path performance data.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
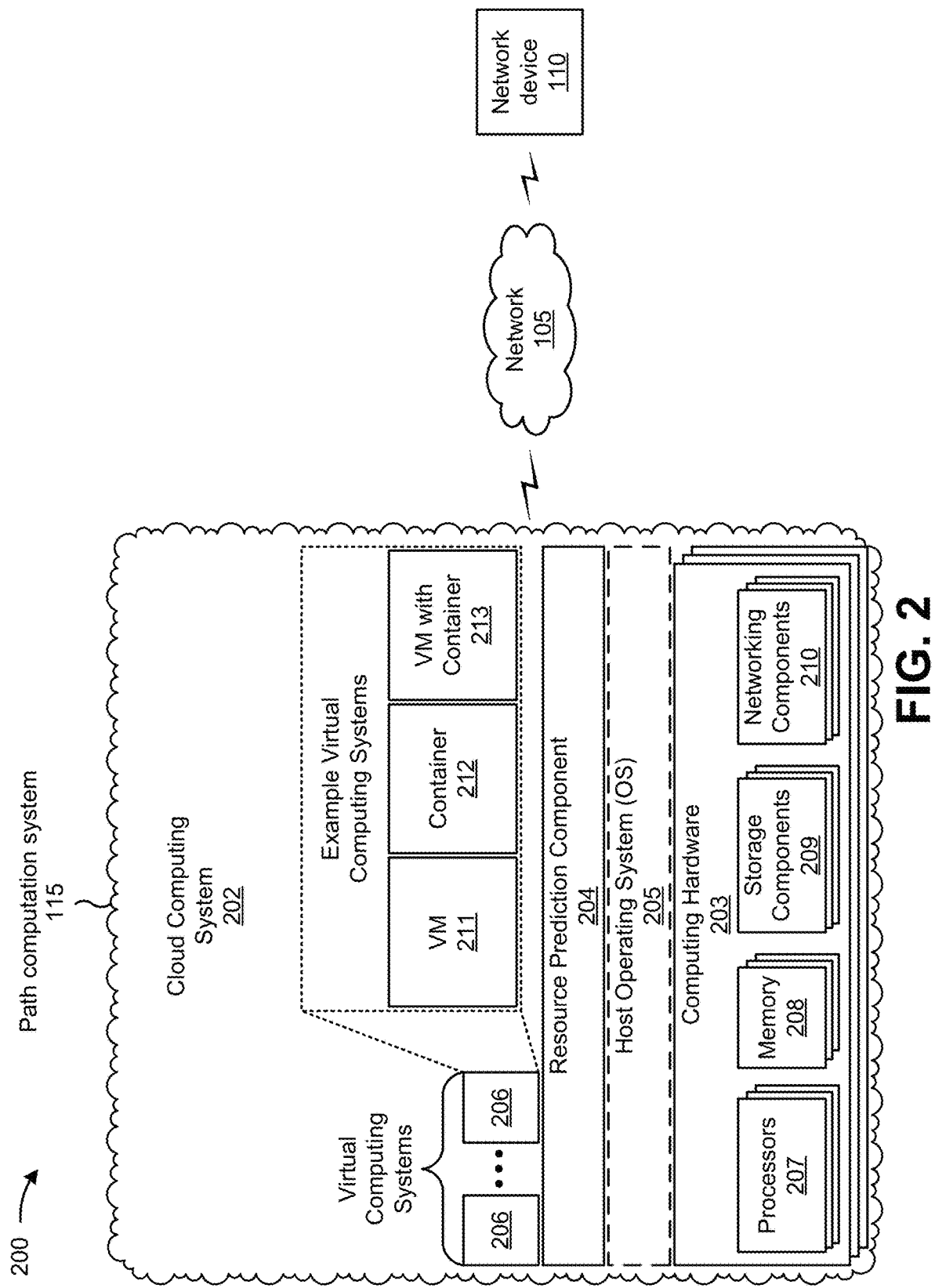
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include path computation system 115, which may include one or more elements of and/or may execute within a cloud computing system 202. The cloud computing system 202 may include one or more elements 203-213, as described in more detail below. As further shown in FIG. 2, environment 200 may include network 105 and/or network device 110. Devices and/or elements of environment 200 may interconnect via wired connections and/or wireless connections.

Network 105 may include one or more network device 110 that connect a RAN with a core network. Network 105 may include one or more wired and/or wireless networks. For example, network 105 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks.

Network device 110 includes one or more devices capable of receiving, processing, storing, routing, and/or providing traffic (e.g., a packet, other information or metadata, and/or the like) in a manner described herein. For example, network device 110 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 110 may include a gateway, a switch, a firewall, a hub, a bridge, a reverse proxy, a server (e.g., a proxy server, a cloud server, a data center server, and/or the like), a load balancer, and/or a similar device. In some implementations, network device 110 may be a physical device implemented within a housing, such as a chassis. In some implementations, network device 110 may be a virtual device implemented by one or more computing devices of a cloud computing environment or a data center. In some implementations, a group of network devices 110 may be a group of data center nodes that are used to route traffic flow through a network.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although path computation system 115 may include one or more elements 203-213 of the cloud computing system 202, may execute within the cloud computing system 202, and/or may be hosted within the cloud computing system 202, in some implementations, path computation system 115 may not be cloud-based (e.g., may be implemented outside of a cloud computing system) or may be partially cloud-based. For example, path computation system 115 may include one or more devices that are not part of the cloud computing system 202, such as device 300 of FIG. 3, which may include a standalone server or another type of computing device. Path computation system 115 may perform one or more operations and/or processes described in more detail elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
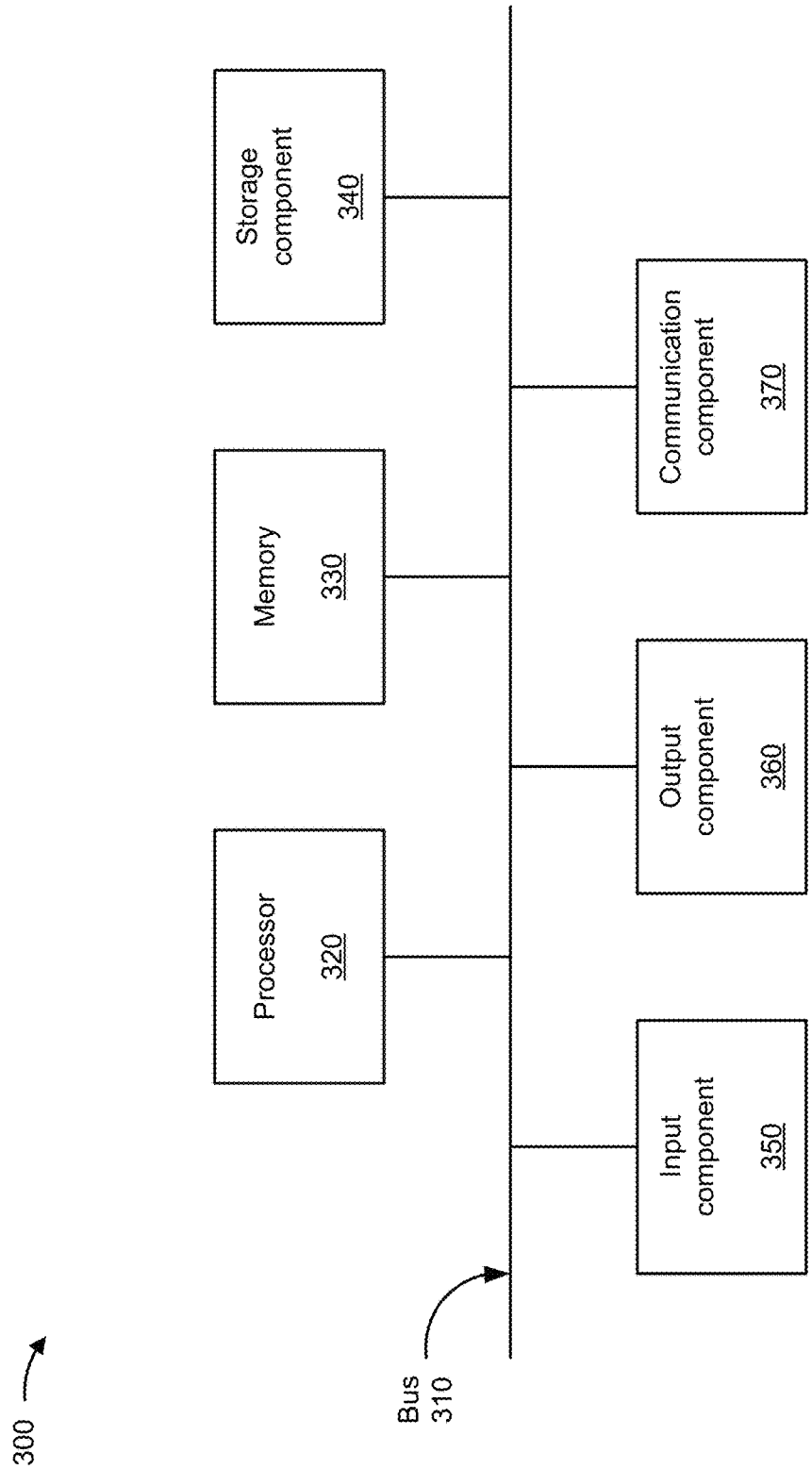
FIG. 3 is a diagram of example components of one or more devices of FIG. 2.

FIG. 3 is a diagram of example components of a device 300, which may correspond to path computation system 115 and/or network device 110. In some implementations, path computation system 115 and/or network device 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
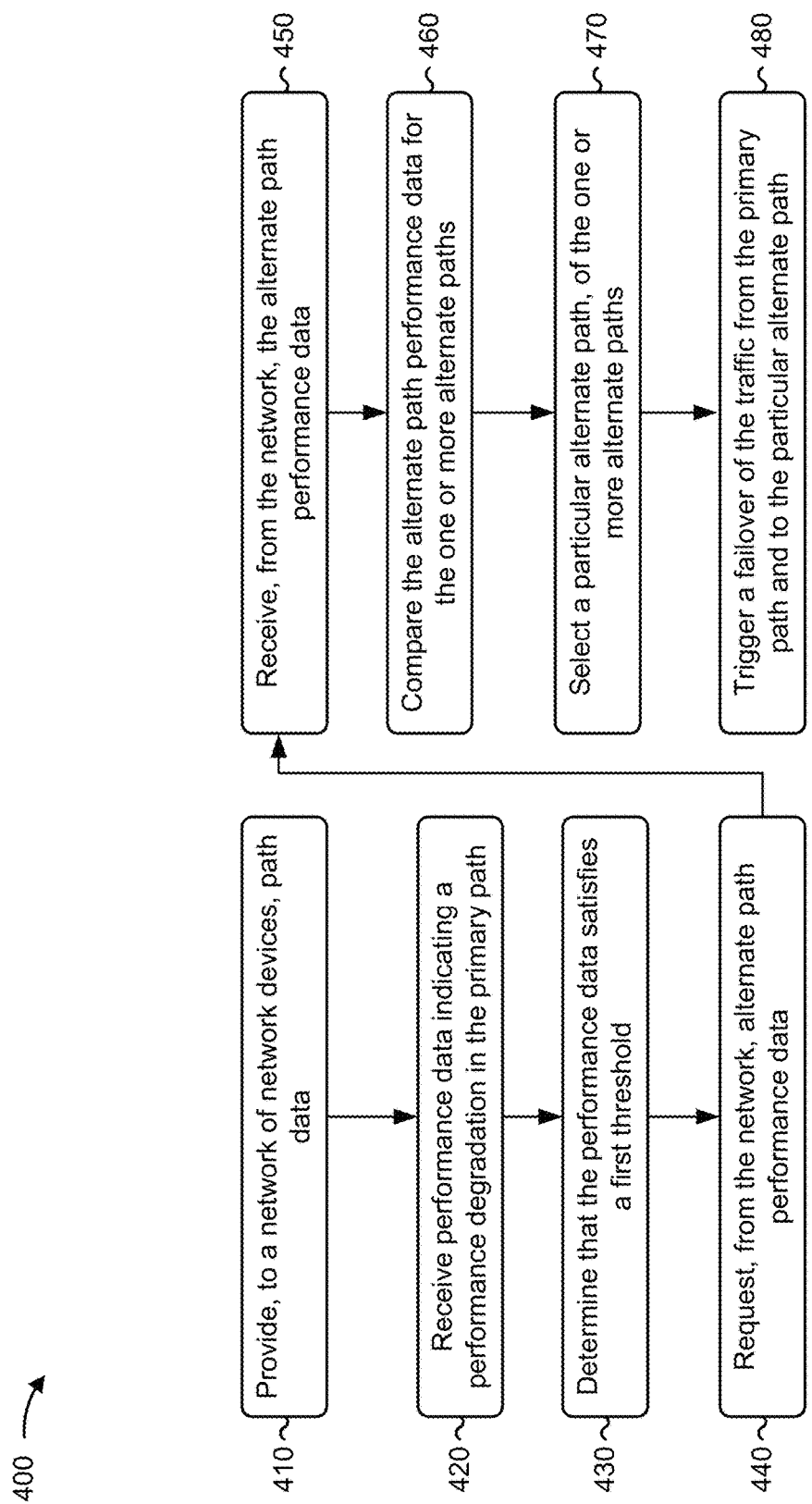
FIG. 4 is a flowchart of an example process for utilizing SRv6 for latency metrics reduction.

FIG. 4 is a flowchart of an example process 400 associated with utilizing SRv6 for latency metrics reduction. In some implementations, one or more process blocks of FIG. 4 may be performed by a device (e.g., path computation system 115). In some implementations, one or more process blocks of FIG. 4 may be performed by another device or a group of devices separate from or including the device, such as a network device (e.g., network device 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include providing, to a network of network devices, path data (block 410). For example, the device may provide, to a network of network devices, path data identifying a primary path and one or more alternate paths for segment routing traffic in the network, as described above. The traffic may include Internet protocol version 6 packets with headers that include individual network instructions. The primary path and the one or more alternate paths may be data plane paths and/or may provide SRv6 for the traffic. In some implementations, the device may monitor the performance data of the primary path. For example, the device may continuously monitor the performance data of the primary path based on providing the path data to the network of network devices.

As further shown in FIG. 4, process 400 may include receiving performance data indicating a performance degradation in the primary path (block 420). For example, the device may receive performance data indicating a performance degradation in the primary path, as described above. The performance data may include data identifying a latency associated with the primary path, a packet loss associated with the primary path, and/or packet jitter associated with the primary path. The device may determine that the performance data indicates a degradation in the primary path based on the latency, the packet loss, and/or the packet jitter associated with the primary path.

As further shown in FIG. 4, process 400 may include determining that the performance data satisfies a first threshold (block 430). For example, the device may determine that the performance data satisfies a first threshold, as described above.

As further shown in FIG. 4, process 400 may include requesting, from the network, alternate path performance data (block 440). For example, the device may request, from the network and based on the performance data satisfying the first threshold, alternate path performance data identifying performances of the one or more alternate paths, as described above.

As further shown in FIG. 4, process 400 may include receiving, from the network, the alternate path performance data (block 450). For example, the device may receive, from the network, the alternate path performance data based on the request, as described above. The alternate path performance data may include data identifying a latency associated with each of the one or more alternate paths, a packet loss associated with each of the one or more alternate paths, and/or packet jitter associated with each of the one or more alternate paths. In some implementations, the device may utilize TWAMP to receive the alternate path performance data from the network.

As further shown in FIG. 4, process 400 may include comparing the alternate path performance data for the one or more alternate paths (block 460). For example, the device may compare the alternate path performance data for the one or more alternate paths, as described above.

As further shown in FIG. 4, process 400 may include selecting a particular alternate path, of the one or more alternate paths (block 470). For example, the device may select a particular alternate path, of the one or more alternate paths, based on comparing the alternate path performance data for the one or more alternate paths, as described above. In some implementations, the device may select one of the one or more alternate paths, with a greatest performance (e.g., a least amount of latency, a smallest quantity of dropped packets, a least amount of jitter, and/or the like) relative to performances of the remaining one or more alternate paths, as the particular alternate path.

As further shown in FIG. 4, process 400 may include triggering a failover of the traffic from the primary path and to the particular alternate path (block 480). For example, the device may trigger, based on the performance data satisfying a second threshold, a failover of the traffic from the primary path and to the particular alternate path, after selection of the particular alternate path, as described above.

In some implementations, the device may maintain the primary path for the traffic based on the performance data failing to satisfy the first threshold and the second threshold, after selection of the particular alternate path. The device may prevent receipt of the alternate path performance data based on maintaining the primary path for the traffic. In some implementations, the device may revert the traffic back to the primary path after triggering the failover of the traffic to the particular alternate path based on the performance data failing to satisfy the first threshold and the second threshold. The device may prevent receipt of the alternate path performance data based on reverting the traffic back to the primary path.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    providing, by a device and to a network, path data identifying a primary path and one or more alternate paths for segment routing traffic in the network;
    receiving, by the device, primary path performance data indicating a performance degradation in the primary path;
    determining, by the device, that the primary path performance data satisfies a first threshold;
    requesting, by the device, from the network, and based on the primary path performance data satisfying the first threshold, alternate path performance data identifying performances of the one or more alternate paths;
    receiving, by the device, the alternate path performance data based on the request;
    comparing, by the device, the alternate path performance data identifying performances of the one or more alternate paths with other alternate path performance data identifying performances of other alternate paths of the one or more alternate paths;
    selecting, by the device and based on comparing the alternate path performance data, a particular alternate path;
    maintaining, by the device, based on the primary path performance data failing to satisfy a second threshold, and after determining that the primary path performance data satisfies the first threshold, the primary path;
    preventing, by the device and based on the primary path performance data satisfying the first threshold and failing to satisfy the second threshold, receipt of the alternate path performance data;
    triggering, by the device, based on the primary path performance data satisfying the second threshold after maintaining the primary path, a failover of the traffic from the primary path and to the particular alternate path, after selection of the particular alternate path;
    monitoring, by the device and after triggering the failover, performance of the primary path;
    determining, by the device, that information associated with the performance of the primary path fails to satisfy the second threshold; and
    reverting, by the device, the traffic from the particular alternate path to the primary path.

2. The method of claim 1, further comprising:
    monitoring the primary path performance data of the primary path.

3. The method of claim 1, wherein the primary path and the one or more alternate paths provide segment routing for the traffic over an Internet protocol version 6 data plane.

4. The method of claim 1, further comprising:
    preventing receipt of the alternate path performance data based on maintaining the primary path for the traffic.

5. The method of claim 1, further comprising:
    preventing receipt of the alternate path performance data based on reverting the traffic back to the primary path.

6. The method of claim 1, further comprising:
    preventing, based on reverting the traffic, new alternate path performance data associated with the particular alternate path.

7. A device, comprising:
    one or more processors configured to:
    provide, to a network, path data identifying a primary path and one or more alternate paths for segment routing traffic in the network;
    receive primary path performance data of the primary path;
    determine that the primary path performance data indicates a performance degradation in the primary path and satisfies a first threshold;
    request from the network, and based on the primary path performance data satisfying the first threshold, alternate path performance data identifying performances of the one or more alternate paths;
    receive, from the network, the alternate path performance data based on the request;
    compare the alternate path performance data identifying performances of the one or more alternate paths with other alternate path performance data identifying performances of other alternate paths of the one or more alternate paths;
    select, based on comparing the alternate path performance data, a particular alternate path;
    maintain, based on the primary path performance data failing to satisfy a second threshold, the primary path;
    prevent, based on the primary path performance data satisfying the first threshold and failing to satisfy the second threshold, receipt of the alternate path performance data;
    trigger, based on the primary path performance data satisfying the second threshold, a failover of the traffic from the primary path and to the particular alternate path, after selection of the particular alternate path;
    continue monitoring, after triggering the failover, performance of the primary path;
    determine that information associated with the performance of the primary path fails to satisfy the second threshold; and
    revert the traffic from the particular alternate path to the primary path.

8. The device of claim 7, wherein the primary path performance data of the primary path includes data identifying one or more of:
 a latency associated with the primary path,
 a packet loss associated with the primary path, or
 a packet jitter associated with the primary path.

9. The device of claim 7, wherein the alternate path performance data includes data identifying one or more of:
 a latency associated with each of the one or more alternate paths,
 a packet loss associated with each of the one or more alternate paths, or
 a packet jitter associated with each of the one or more alternate paths.

10. The device of claim 7, wherein the one or more processors are configured to, when receiving the alternate path performance data based on the request:
 utilize a two-way active measurement protocol to receive the alternate path performance data from the network.

11. The device of claim 7, wherein the one or more processors are configured to, when selecting the particular alternate path:
 select one of the one or more alternate paths, with a greatest performance relative to performances of remaining one or more alternate paths, as the particular alternate path.

12. The device of claim 7, wherein the primary path and the one or more alternate paths are data plane paths.

13. The device of claim 7, wherein the traffic includes Internet protocol version 6 packets with headers that include individual network instructions.

14. The device of claim 7, wherein the one or more processors are configured to:
 monitor, based on the performance data failing to satisfy the second threshold, and after determining that the primary path performance data satisfies the first threshold, the primary path performance data to determine whether the primary path performance data satisfies the second threshold.

15. A non-transitory computer-readable medium storing a set of instructions, the set of instructions comprising:
 one or more instructions that, when executed by one or more processors of a device, cause the device to:
  provide, to a network of network devices, path data identifying a primary path and one or more alternate paths for segment routing traffic in the network;
  receive primary path performance data indicating a performance degradation in the primary path;
  determine that the primary path performance data satisfies a first threshold;
  request from the network, and based on the primary path performance data satisfying the first threshold, alternate path performance data identifying performances of the one or more alternate paths;
  receive, from the network, the alternate path performance data based on the request;
  compare the alternate path performance data identifying performances of the one or more alternate paths with other alternate path performance data identifying performances of other alternate paths of the one or more alternate paths;
  select, based on comparing the alternate path performance data, a particular alternate path;
  maintain, based on the primary path performance data failing to satisfy a second threshold, the primary path;
  prevent, based on the primary path performance data satisfying the first threshold and failing to satisfy the second threshold, receipt of the alternate path performance data;
  trigger, based on the primary path performance data satisfying the second threshold, a failover of the traffic from the primary path and to the particular alternate path, after selection of the particular alternate path;
  maintain the primary path for the traffic based on the primary path performance data failing to satisfy the first threshold and the second threshold, after selection of the particular alternate path;
  continue monitoring, after triggering the failover, performance of the primary path;
  determine that information associated with the performance of the primary path fails to satisfy the second threshold; and
  revert the traffic from the particular alternate path to the primary path.

16. The non-transitory computer-readable medium of claim 15, wherein the one or more instructions further cause the device to:
 monitor the primary path performance data of the primary path.

17. The non-transitory computer-readable medium of claim 15, wherein the one or more instructions further cause the device to:
 prevent receipt of the alternate path performance data based on the primary path being maintained for the traffic.

18. The non-transitory computer-readable medium of claim 15, wherein the one or more instructions further cause the device to:
 revert the traffic back to the primary path after triggering the failover of the traffic to the particular alternate path and based on the primary path performance data failing to satisfy the first threshold and the second threshold; and
 prevent receipt of the alternate path performance data based on reverting the traffic back to the primary path.

19. The non-transitory computer-readable medium of claim 15, wherein the one or more instructions, that cause the device to receive the alternate path performance data based on the request, cause the device to:
 utilize a two-way active measurement protocol to receive the alternate path performance data from the network.

20. The non-transitory computer-readable medium of claim 15, wherein the one or more instructions, that cause the device to select the particular alternate path, cause the device to:
 select one of the one or more alternate paths, with a greatest performance, as the particular alternate path.

* * * * *